United States Patent
Tilden, Jr. et al.

(10) Patent No.: US 6,449,635 B1
(45) Date of Patent: Sep. 10, 2002

(54) ELECTRONIC MAIL DEPLOYMENT SYSTEM

(75) Inventors: Philip N. Tilden, Jr., Rialto; Robert E. Strack, Santa Monica; Christopher E. Donaldson, Woodland Hills, all of CA (US)

(73) Assignee: MindArrow Systems, Inc., Huntington Beach, CA (US)

( * ) Notice: Subject to any disclaimer, the term of this patent is extended or adjusted under 35 U.S.C. 154(b) by 0 days.

(21) Appl. No.: 09/295,933

(22) Filed: Apr. 21, 1999

(51) Int. Cl.[7] .............................................. G06F 15/16
(52) U.S. Cl. ........................ 709/206; 709/201; 709/203
(58) Field of Search ................................ 709/201, 203, 709/206

(56) References Cited

U.S. PATENT DOCUMENTS

| | | | |
|---|---|---|---|
| 5,781,901 A | * 7/1998 | Kuzma ........................ 358/402 |
| 5,818,447 A | 10/1998 | Wolf et al. | |
| 5,822,543 A | 10/1998 | Dunn et al. | |
| 5,826,267 A | 10/1998 | McMillan | |
| 5,835,712 A | 11/1998 | DuFresne | |
| 5,864,676 A | 1/1999 | Beer et al. | |
| 5,864,823 A | 1/1999 | Levitan | |
| 5,870,719 A | 2/1999 | Maritzen | |
| 5,903,723 A | * 5/1999 | Beck et al. ..................... 707/10 |
| 6,009,462 A | * 12/1999 | Birrell et al. ................ 709/206 |
| 6,014,688 A | * 1/2000 | Venkatraman et al. ...... 709/206 |
| 6,014,689 A | 1/2000 | Budge et al. ................ 709/206 |
| 6,134,582 A | * 10/2000 | Kennedy ..................... 709/203 |
| 6,178,442 B1 | * 1/2001 | Yamazaki .................... 709/203 |
| 6,223,213 B1 | * 4/2001 | Cleron et al. ................ 709/206 |
| 6,249,808 B1 | * 6/2001 | Seshadri ...................... 709/203 |
| 6,256,672 B1 | * 7/2001 | Redpath ...................... 709/206 |
| 6,275,850 B1 | * 8/2001 | Beyda et al. ................ 358/402 |
| 6,327,612 B1 | * 12/2001 | Watanabe .................... 709/206 |
| 6,332,164 B1 | * 12/2001 | Jain ............................ 709/203 |
| 6,334,142 B1 | * 12/2001 | Newton et al. .............. 709/203 |

FOREIGN PATENT DOCUMENTS

| | | |
|---|---|---|
| EP | 0 739 115 A2 | 10/1996 |
| EP | 0 869 652 A2 | 10/1998 |
| WO | WO 00/45321 | 8/2000 |

* cited by examiner

*Primary Examiner*—Krisna Lim
(74) *Attorney, Agent, or Firm*—Brown Martin Haller & McClain

(57) ABSTRACT

A data distribution system includes a server computer for transmitting email files to a computer network for access by remote computers having email client computer software for displaying the email files; the server includes a script program as a portion of a secondary e-mail message that also includes tracking information; a predefined message is also stored as a main message, the script program also including a command that displays the predefined message by retrieving the second source file. The Script program can further include a command for passing information to the server computer, and a command for replacing a first image with a second image. When the server computer receives the transmitted information, a reply is transmitted, and the script program executes the command for replacing in response to the reply. The command for passing the information can be executed in response to a user action directed to the first image. The reply can be transmitted upon completion of a task initiated in response to the user action for providing visual confirmation of task completion. Also disclosed are methods for distributing the messages and signaling completion of server tasks by exchanging button images.

23 Claims, 3 Drawing Sheets

ELECTRONIC MAIL DEPLOYMENT SYSTEM

BACKGROUND

The present invention relates to communication networks, and more particularly to networks providing electronic mail to a multiplicity of users.

A recent development is the wide use of network communications over the Internet, on which a wide variety of information is available in massive volumes using local telephone connections and personal computers. The Internet is actually a collection of networks and gateways that use the Transport Control Protocol/Interface Program (TCP/IP) suite of protocols that was developed by the U.S. Department of Defense. The local telephone connections are typically to nearby network server computers (servers) that have connections to other servers. Documents and other information are commonly stored on the Internet using Hyper Text Transfer Protocol (HTTP) in HTML or ASP format in web sites that are implemented at associated servers, the sites being addressed and navigated by using "browser" software of user's computers, HTML being the language typically interpreted by web browsers to generate displaying using display files known as web pages. The Internet "address" of a file, known as a URL, is typically of the form "http://www/[x][/y]", where [x] is a main address and [/y] is a directory path to a web page which may be located in a directory accessible to the server.

A great advantage of this technology is that a large segment of the general population has access to the Internet from home. However, although much of that information is provided free of charge, locating information relevant to a particular user's needs can be a daunting task that involves sifting through great volumes of extraneous records. So it is with advertisements and product catalogs that may be accessible in the Internet, that potential customers are discouraged from seeking sources of goods and services that they desire.

Electronic mail, in addition to being implemented within particular local networks and organizational entities (Intranet), is also widely used on the Internet, the mail being typically held temporarily on the mass storage device of a mail server typically hosted by an Internet Service Provider (ISP) to which the user subscribes. An Email Client, hosted by the user's computer, may download, open, and display to the user the user's electronic mail.

One result of the wide use of the Internet is a large volume of electronic mail traffic in the form of advertisements that are distributed to targeted users. However, advertisements in the form of electronic mail are expensive to provide to a large audience, particularly when the content is formatted together with a personalized message to each recipient. Also, many users will delete mail that is perceived to be advertising before actually viewing it, especially if it is the form of an attachment to a short message.

Thus there is a need for an efficient and inexpensive way to provide communications including large volumes of predefined information to a multiplicity of user destinations. There is a further need for an inexpensive and reliable means for tracking actual receipt of the information.

SUMMARY

The present invention meets this need by providing a network data distribution system wherein predefined blocks of information can be transmitted to a multiplicity of users in connection with small electronic messages, but without being contained in the messages or being attachments of the messages. Instead, when the small message is opened by the user, a predetermined web page is automatically retrieved into the message, greatly expanding the message. Features that can be included in the system are visual notification that the expansion is complete without either being taken to a different web page if in a web page environment or without invoking a web browser if in an e-mail environment.

In one aspect of the invention, the system includes a server computer having means for receiving source files, and means for transmitting email files to a computer network for access by remote computers having email client computer software for displaying the email files; means for storing a script program as a portion of a first source file; means for storing a predefined message as a second source file; means for including in the script program a command that displays the predefined message by retrieving the second source file; and means for directing the first source file to an email address of a user.

The system can further include means for including tracking information in the first source file; and means for including in the script program a command for transmitting the tracking information to the server computer. The tracking information can include the user's email address.

The system can further include means for including in the script program a command for passing information to the server computer; means for including in the script program a command for replacing a first image with a second image; means at the server computer for receiving the transmitted information; means at the server computer for transmitting a reply in response to the transmitted information; and means for including in the script program a command to execute the command for replacing in response to the reply. The command for passing the information can be executed in response to a user action directed to the first image. The reply can be transmitted upon completion of a task initiated in response to the user action.

In another aspect of the invention, a method for distributing a predetermined main message to a multiplicity of users includes the steps of:
 (a) providing the main message at a main address;
 (b) providing a script program including a command for retrieving the main message from the main address;
 (c) inserting the script program in respective secondary messages;
 (d) addressing the secondary messages to the multiplicity of users; and
 (e) receiving the main message into each of the secondary messages upon execution of the script program.

The step of providing a script program can include a command for transmitting tracking information to the server computer upon execution of the script program.

In a further aspect of the invention, a method for distributing a plurality of main messages to a user includes the steps of:
 (a) providing a plurality of main messages;
 (b) locating one of the main messages at a main address;
 (c) providing a script program including a command for retrieving from the main address the located message;
 (d) inserting the script program in a secondary message;
 (e) addressing the secondary message to the user;
 (f) receiving the located message into the secondary message upon execution of the script program; and
 (g) locating a different one of the main messages at the main address, whereby the different main message is received into the secondary message upon a subsequent execution of the script program.

The locating step can be periodically repeated, thereby facilitating subscription to periodical publications based on a single secondary message.

In yet a further aspect of the invention, a method for distributing from a first location a predetermined message to a user at a second location and signaling completion of a user-initiated transaction includes the steps of:

(a) providing the message, the message containing a first image;

(b) providing a script program segment having a command for replacing the first image with a second image, and a command for passing information to the first location in response to user input at the second location;

(c) inserting the script program into the message;

(d) addressing the message to the user at the second location from the first location;

(e) at the first location, receiving information passed in response to the user input at the second location;

(f) transmitting a reply from the first location to the second location in response to the passed information; and (g) executing the command for replacing the first image with the second image, thereby graphically displaying at the second location receipt of the passed information at the first location.

The method can include the further step of completing a task at the second location in response to receipt of the passed information, and wherein the step of transmitting the reply is performed upon completion of the task, thereby providing visual confirmation of task completion.

DRAWINGS

These and other features, aspects, and advantages of the present invention will become better understood with reference to the following description, appended claims, and accompanying drawings, where:

DESCRIPTION

The present invention is directed to a system for deploying email using short email messages, which when opened call a large body of information from another location.

Figure 1:
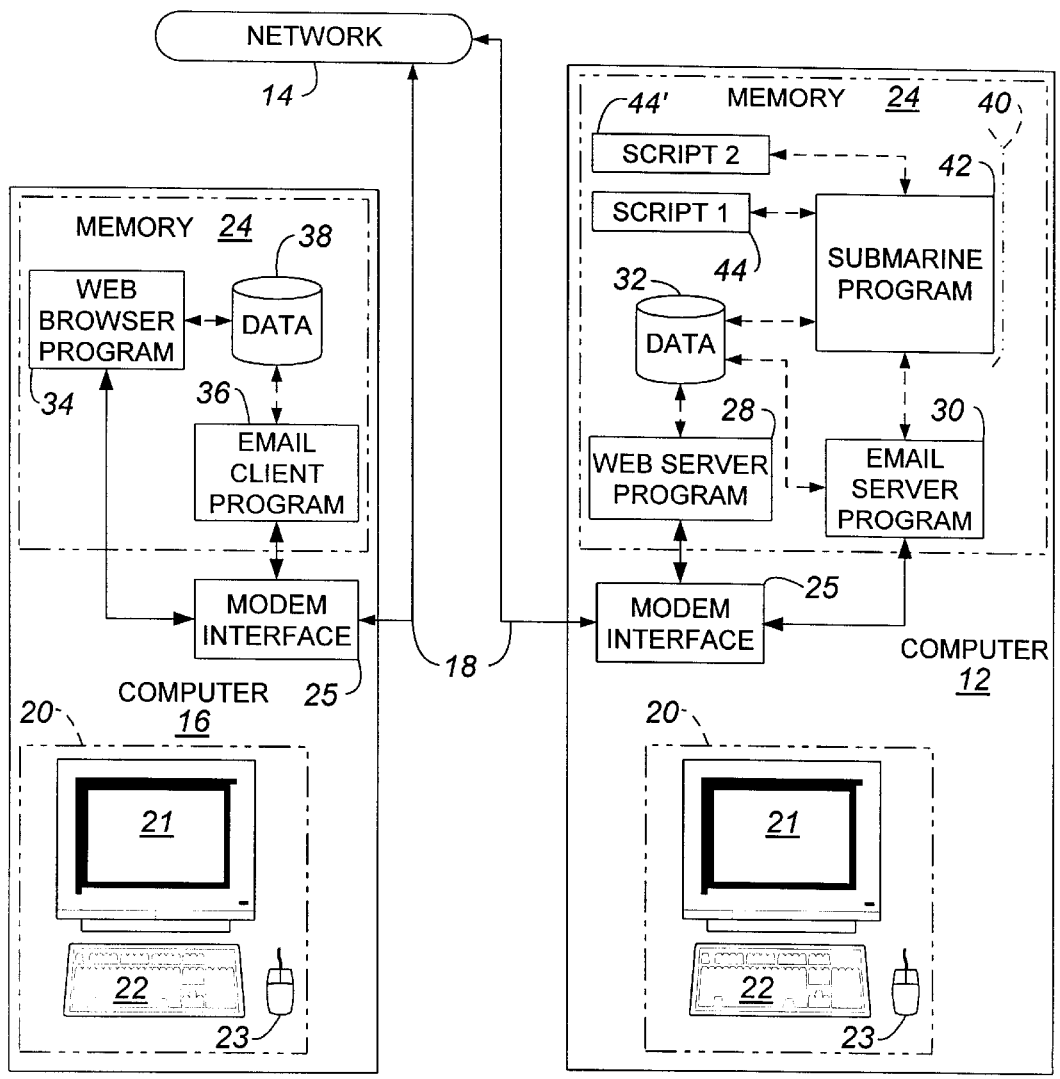
FIG. 1 is a pictorial diagram of a communication network incorporating an electronic mail distribution system according to the present invention.

With reference to FIG. 1 of the drawings, a network communication system 10 includes a server computer 12 for receiving, processing, and transmitting data relative to a distributed computer,network 14, a subscriber computer 16 being connectable to the network 14. In an exemplary implementation, the computer network 14 has connected thereto a multiplicity of communication lines 18, a plurality of the server computers 12, and a multiplicity of the subscriber computers 16. The server computer 12 has an operator interface 20 including a screen display 21, a keyboard 22, and a pointing device or mouse 23. The computer 12 also includes a memory 24 and a modem interface 25 that is suitably connected to the network 14 for bidirectional communication therewith. The memory 24 typically includes volatile random access memory (RAM) and non-volatile memory such as read-only memory (ROM) and random access disk memory. As used herein, storage in non-volatile memory can include temporary storage in volatile memory. It will be understood that a single server may communicate with more than one of the subscriber computers 16. In the exemplary implementation described herein, the communication network 14 is the Internet, with at least some of the communication lines 20 being conventional telephone utility lines, each computer having a suitable modem or digital port (not shown) for interfacing with the telephone utility lines. The server computer 12 has in its memory 24 a conventional-web server program 28, and a similarly conventional electronic mail server program 30, each of the programs 28 and 30 having access to mass data storage 32. As further shown in FIG. 1, the subscriber computer 16 has counterparts of the operator interface 20 including the screen display 21, the keyboard 22, and the mouse 23, as well as the memory 24 and the modem interface 25. Also, the subscriber computer 16 has in its memory 24 a web browser program 34 and an electronic mail client program 36, the programs 34 and 36 having access to a mass storage device 38. The server computer 12 can be suitably implemented running Windows NT 4.0 and one or more of Microsoft Internet Information server 4.0, Microsoft Index server, Microsoft Site-server Express, Microsoft Active Server Pages, Microsoft SQL-Server 6.5, and Microsoft Transaction Server that are commercially available programs of Microsoft of Redmond, Wash.

According to the present invention, the network 10 is provided with an e-mail distribution system 40 that includes a distribution program 42 for dispatching short secondary messages that incorporate script programs as described herein. In an exemplary embodiment, the distribution program 42 is a "submarine" program that sends the secondary messages as email to a list of email addresses. The emails themselves are of a specific design to allow them to be very small, and when opened they contact an Internet server and pull in the content, which can be anything that is displayable on a web page. It will be understood that in a web page there are several methods for retrieving information that are more efficient than the method of the present invention; however, they are not suitable for retrieving information into e-mail messages, the problem addressed by this invention.

Preferably the submarine program 42 inserts tracking information in each email that it sends. The tracking information includes the email address and optionally an "adcode" (a 6 to 10 character name that identifies a particular email campaign). The initial email has no content other than the. tracking information and instructions on what to do if the email fails to display. Because the initial email is so small, and upon arrival gets really big (sort of explodes) so is called a "torpedo". The content that is pulled by the torpedo is called the "payload". The payload can be changed at any time, and the next time a previously sent torpedo is opened it will display the new payload. Thus a newsletter can be sent one time and can be updated repeatedly.

Figure 2:
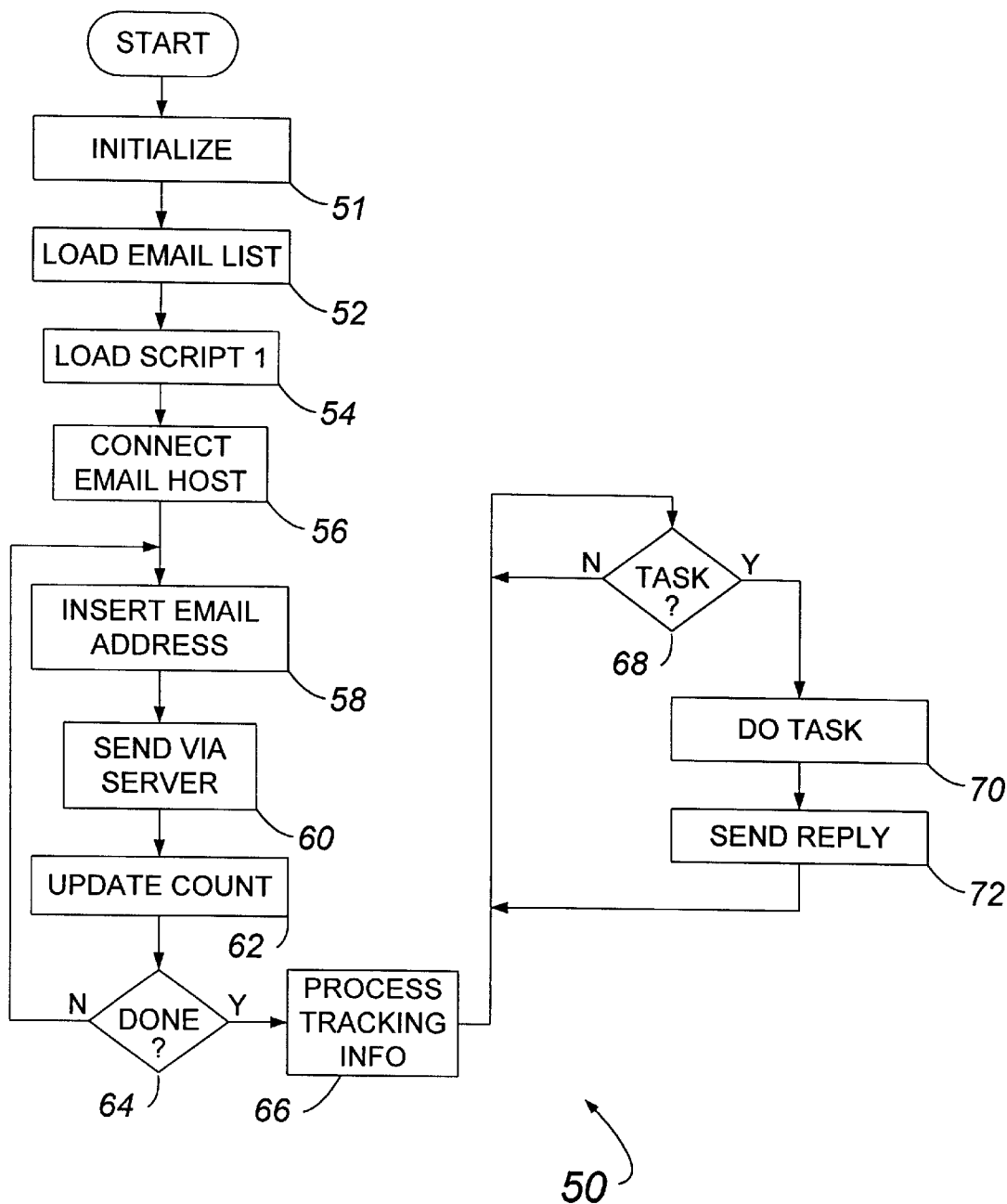
FIG. 2 is a flow chart for a computer process of the system of FIG. 1.

With further reference to FIG. 2, the submarine program 42 initiates a distribution process 50 with an initialization step 51, loading an email list from the mass data storage 32 in a load list step 52, and loading the torpedo information including the first script file 44 in a load script step 54. Then a connect host step 56 connects to an Internet Email Server (a.k.a. email host). For each email address the program inserts the email address (much like a mail merge) in an insert address step 58, and sends it out via the Internet Email Server in a send message step 60. Next, a counter previously reset in the initialization step 51 is incremented in a count step 62. Thus the program 42 keeps an up to date log of how many messages it has processed so that in the event of a system failure the process can pickup where it left off without missing anyone or sending duplicate emails. Following the update count step 62, a done test step 64 determines from the count whether all of the messages have been sent, passing control to a tracking portion of the program as described below; otherwise, control is returned to the insert address step 58 for dispatching further messages. The submarine program 42 can be written in PERL, a programming language commonly used on servers and other personal computers (PCs). (In PERL, comments begin with "#" and end at the end of the line.)

Script Design

In an exemplary configuration of the system 40, the script files are written in Javascript, a programming language that is available in web browser programs such as Netscape Navigator and Microsoft Internet Explorer. Using Javascript, the script file 44 must have a filename ending in ".js", the first line of the file must be "<!--", and the last line must be "//--". Comments, if present, begin with "//" and end at the end of the line. (If present, comments in HTML begin with "<!--" and end with "-->".) Javascript has a command, called "write('?')", for displaying information by passing the information to a program that is interpreting HTML. Thus the information to be passed must be in HTML format, and the question mark is replaced with a full URL to a server file containing the information. The Javascript command for retrieving the file and running the program is <script language="javascript" src="?"></script>, the question mark being replaced with the full URL as described above. The following is an exemplary and preferred implementation of the script, in this case displaying "Hi There" in large letters:

1. The script file 44 contains the following three lines:
   document.write('<h1>Hello There,</h1>)
2. Assuming the Server name is "something.com" and the script file 44 is in a directory "stuff" and named "hello.js", the command included with the email message would be:
   <script language="javascript" [sp] src="http://something.com/stuff/hello.js" ></script>

Although the above example is quite simple, a major application of the present invention is to deliver large quantities of information into the short e-mail messages automatically upon opening (and viewing) of the e-mail by the user.

Message Tracking

The script file 44 also preferably includes a command for transmitting the user's e-mail address back to the server, the distribution program 44 also including instructions for recording successful opening of the secondary message and receipt of the main message at a suitable destination on the mass data storage 32 or other suitable destination. Thus the process 50 includes a process tracking step 66 following the test done step 64. The preferred inclusion of the campaign code as indicated above facilitates tracking of multiple campaigns in separate files of the data storage 32, and/or to separated destinations associated with each campaign.

Functional Images

A preferred feature of the distribution system 40 of the present invention is the use of functional images. As used herein, an image is simply a picture displayed to the user. This feature allows an email or web page to pass information entered by the user to a program on a server and allows the program to display the results as an image. The information entered by the user may be as simple as selecting a link, or as complex as filling in a form. The information can be passed in Secure Mode if needed. Secure Mode is a method of sending information to a server in an encrypted format, to prevent the information from being readable by anyone that might intercept it. Secure Mode is also known as Secure Socket Layer or SSL. Javascript has a command that will replace an image in an email. The source of the image can be a file or a program on the server. The email must be in HTML format, the email client must be able to display HTML email, and the connection to the internet must be open. The distribution program 42 receives information passed from the subscriber computer 16, processes the information, and sends back an image. As further shown in FIG. 2, program control is passed to a test task step 68 following the process tracking step 66, looping thereat until information passed from the subscriber computer 16 is received, whereupon a transaction task is performed in response to the user's request in a do task step 70. The task could be filling of an order for products or services, or anything else that would be an appropriate response to the user input. Finally, a second image is transmitted to the subscriber computer 16 in a send reply step 72, and control is returned to the test task step 68 for processing additional input from the same or different users.

Figure 3:
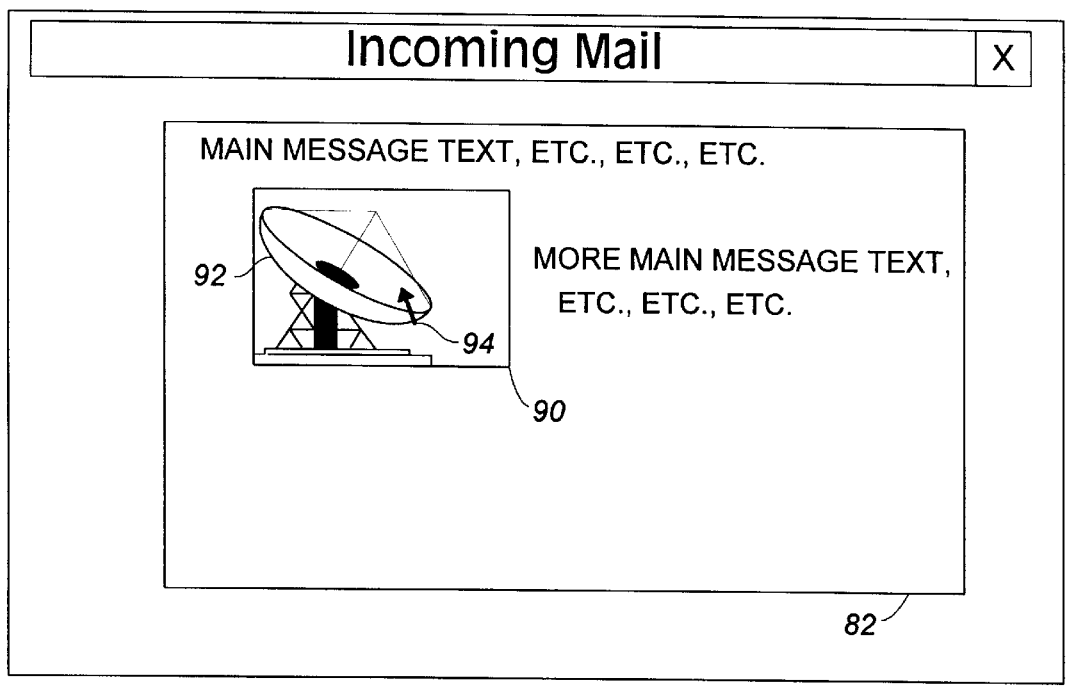
FIG. 3 is a screen diagram showing a portion of an e-mail containing a functional image transmitted by system of FIG. 1.
Figure 4:
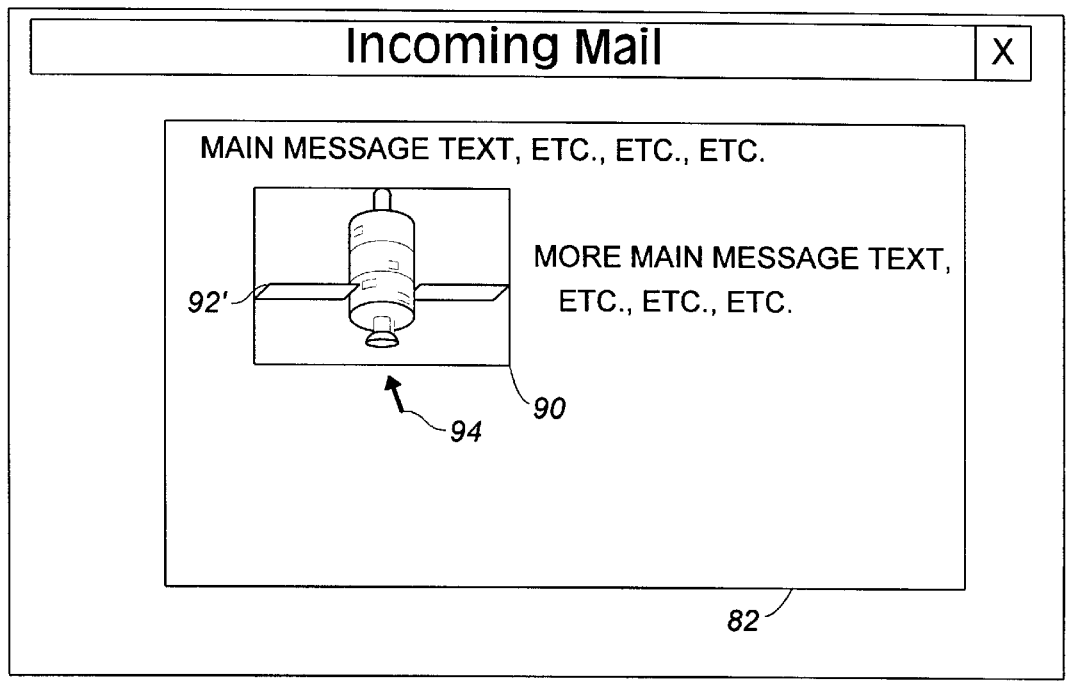
FIG. 4 is a screen diagram as in FIG. 3, showing substitution of a different image following processing of a transaction by the system of FIG. 1.

Accordingly, the script file 44 (or 44') includes a program segment for passing the information to the distribution program 42, and to execute the command for replacing the image. The original image can be in the form of a button which can be "clicked on", the image of the button being transformed or "morphed" on the screen display 21 of the subscriber computer 16 to reflect the new image once the transaction has been completed at the server computer 12. With further reference to FIGS. 3 and 4, an e-mail screen 80 of the subscriber computer 16 includes a received message 82 that contains text and a "button" 90 having a first image 92 thereon as shown in FIG. 3. By positioning a cursor 94 on the button 90 and "clicking" using the mouse 23, the script segment containing the command for passing the information is executed. Following completion of the task by the distribution program 42, the command for replacing the image is executed in response to the reply being received at the subscriber computer 16, the button 90 being transformed as shown in FIG. 4, a second image 92' replacing the first image 92.

An exemplary Javascript form of the script file segment that presents a form on an e-mail that asks for the user's name and phone number, and runs a program on the server to store the information and return an image to show successful processing of the user information is listed below:

```
<!--begin example a-->
<html><body>
<script language="javascript">
<!--
//next line pre-loads the "sending" Image so it will display instantly
var sndg=new Image; sndg.src="http://radicalmail.com/temp/rm 1/pub/sending.gif";
function godo( ) {
//replace the "send" button Image with an Image that shows "sending"
    document.images[frm].src="http://yourserver.com/images/send ing.gif
```

```
//format the data from the form so that it can travel to the
   program on the server
//the pieces of data are separated by a—character
   data=escape(document.forms[frm].elements[0]
       .value)+'-'+esca
pe(document.forms[frm].elements[1].value)
//replace the "sending" Image with the Image that is sent
   ba ck by the program on the server
//addon the data to the URL of the program so the program
   ca n receive it as a "get" input
   document.images[frm].scr='http://yourserver.com/gli-
       bin/you rperlprog.pl?'+data
}
//--></script>
Please enter your name and phone number below then
   click the "send button.
<!--set the action of the form and the method so the
   Email
Client will perform the javascript program instead of
   blowing up if the User presses enter-->
<form name="frm" action="javascript:godo ( )" method=
   "post">
Name: <input name="name" size=30 maxlength=
   50><br>
Phone: <input name="phone" size=30 maxlength=
   50><br>
<!--place the anchor frmx here so the Email Client will
   have a place to jump to, that will not take the button
   off-screen-->
<a name="frmx"></a><br>
<!--set the href to a local anchor, otherwise the Email
   client will blowup-->
<!--display an image of a send button, and name the
   Image so javascript can replace it-->
<a href="#frmx" onclick="godo( )"><img
   src="http://yourserver.com/images/send.gif" width=77
   height=23 name="frm" border=0></a>
After you click "send" wait for the server to say your
   request was received.<br>
Then enter the next persons name and phone number, and
   click "send" again.
</font><form>
</body><html>
<!--end example a-->
An exemplary PERL form of s server program segment to
be invoked by the above Javascript segment is listed below:
begin example b #####
#!/usr/bin/perl
#get the User input
   $buf=$ENV{'QUERY_STRING'};
#open the disk file to store the information in open (outfit,
   '>>'. 'storagefile.dat');
#write the information followed by a newline character to
   make a plain text file
   print outfit $buf, "\n";
#close the disk file
   close (outfit);
#open the disk file that contains the "received" Image
# (the one that will replace the sending Image)
   open (pic, 'sendit-done.gif');
#set the file to binary mode so you can read the entire file
   binmode pic;
#get the size of the Image file
   $siz=-s pic;
#read the file into the variable $z
   $red=read pic, $z, $siz;
#close the disk file
   close dmp;
#set the output channel to binary mode, so the entire
   Image will be sent
   binmode STDOUT;
#send the Image back to the browser
   print $z;
end example B #####
```

Although the present invention has been described in considerable detail with reference to certain preferred versions thereof, other versions are possible. For example, the distribution program 42 can be a collection of separate programs instead of the single program diagramed in FIG. 2.

Also, the distribution program 42 can be provided in compiled form for enhanced security. A further possibility is that the submarine can e-mail to the originator every time it is run so that the originator can determine whether there has been any misuse of the program. Therefore, the spirit and scope of the appended claims should not necessarily be limited to the description of the preferred versions contained herein.

What is claimed is:

1. A system for distributing at least one main message over an electronic network comprising:

a means for providing an initial message having a script, the script comprising transmittal instructions for initiating retrieval of the at least one main message;

at least one server for sending the initial message and the at least one main message over the electronic network; and at least one subscriber computer coupled to the electronic network for receiving the initial message, the at least one subscriber computer having means for executing the script of the initial message and for requesting retrieval of the at least one main message from the at least one server in response to an action on the initial message.

2. The system of claim 1, wherein the action on the initial message comprises viewing the initial message.

3. The system of claim 1, wherein the at least one main message expands the initial message.

4. The system of claim 1, wherein the script of the initial message is written in Javascript.

5. The system of claim 1, wherein the script further comprises tracking transmittal instructions for sending identification and tracking information to the at least one server upon the action on the initial message.

6. The system of claim 1, wherein the action on the initial message comprises a user viewing at least a portion of the initial message to initiate execution of the script for retrieving the at least one main message from the at least one server.

7. The system of claim 1, wherein the script further comprises an address for locating the at least one server.

8. A method of distributing a main message of a plurality of main messages over an electronic network comprising the steps of:

providing an initial message having a script, the script comprising transmittal instructions for retrieving the main message;

storing the initial message and the plurality of main messages on at least one server;

sending the initial message to at least one subscriber computer coupled to the electronic network;

performing an action upon the initial message at the at least one subscriber computer to initiate execution of the script; and retrieving the main message from the at least one server in response to the action upon the initial message.

9. The method of claim 8, wherein the step of performing an action upon the initial message comprises a user viewing the initial message.

10. The method of claim 8, wherein the step of performing an action upon the initial message comprises viewing a portion of the initial message.

11. The method of claim 8, wherein the script further comprises an address for locating the at least one server.

12. The method of claim 8, wherein the script further comprises tracking transmittal instructions for transmitting tracking information to the at least one server from the at least one subscriber computer, the method further comprising the steps of:

processing the tracking transmittal instructions on the at least one subscriber computer; and sending the tracking information to the at least one server in response to the action upon the initial message.

13. The method of claim 8, further comprising the step of retrieving a second main message of the plurality of main messages in response to a subsequent action upon the initial message, wherein the subsequent action re-initiates execution of the script.

14. A method for distributing a main message from at least one server computer to at least one subscriber computer over a communications network, the method comprising the steps of:

providing the main message to the at least one server computer;

providing an initial message to the at least one server computer, the initial message comprising a script program having content transmittal instructions for retrieving the main message from the at least one server computer;

sending the initial message to the at least one subscriber computer over the communications network;

performing an action on the initial message at the at least one subscriber computer, the action for initiating execution of the script program; and retrieving the main message from the at least one server computer upon execution of the script program.

15. The method of claim 14, wherein the script program of the initial message further comprises tracking transmittal instructions for sending identification and tracking information to the at least one server over the communications network upon execution of the script program.

16. The method of claim 14, wherein the step of performing an action on the initial message comprises viewing the initial message.

17. The method of claim 14, wherein the script of the initial message further comprises message identifier transmittal instructions for transmitting a message identifier from the at least one subscriber computer to the at least one server computer, the method further comprising the step of:

processing the message identifier transmittal instructions on the at least one subscriber computer and sending the message identifier to the at least one server computer.

18. The method of claim 14, wherein the script of the initial message further comprises subscriber identifier transmittal instructions for transmitting a subscriber identifier from the at least one subscriber computer to the at least one server computer, the method further comprising the step of:

processing the subscriber identifier transmittal instructions on the at least one subscriber computer and sending the subscriber identifier to the at least one server computer.

19. A system for distributing at least one main message over a communications network comprising:

a server computer means comprising:

a sender client means for transmitting an initial message to at least one subscriber computer over the communications network, the initial message comprising transmittal instructions for sending the at least one main message from a main message server means to the at least one subscriber computer over the communications network; and the main message server means for storing the at least one main message and for sending the at least one main message in response to a request from the at least one subscriber computer; and the at least one subscriber computer for receiving the initial message and the at least one main message, the at least one subscriber computer comprising:

means for processing the transmittal instructions of the initial message; and means for requesting the main message server means to transmit the at least one main message from the main message server means to the at least one subscriber computer over the communications network.

20. The system of claim 19, wherein the initial message further comprises message identifier transmittal instructions for transmitting a message identifier from the at least one subscriber computer to the server computer means.

21. The system of claim 20, wherein the at least one subscriber computer further comprises:

means for processing the message identifier transmittal instructions; and means for sending the message identifier to the server computer means over the communications network.

22. The system of claim 19, wherein the initial message further comprises subscriber identifier transmittal instructions for transmitting a subscriber identifier from the at least one subscriber computer to the to the server computer means.

23. The system of claim 22, wherein the at least one subscriber computer further comprises:

means for processing the subscriber identifier transmittal instructions; and means for sending the subscriber identifier to the server computer means over the communications network.

* * * * *

UNITED STATES PATENT AND TRADEMARK OFFICE
CERTIFICATE OF CORRECTION

PATENT NO.     : 6,449,635 B1                                                Page 1 of 1
DATED          : September 10, 2002
INVENTOR(S)    : Tilden, Jr., Philip N. et al.

It is certified that error appears in the above-identified patent and that said Letters Patent is hereby corrected as shown below:

Column 1,
Line 14, change "Transport Control Protocol Interface Program" to -- Transmission Control Protocol/Interface Protocol --.
Line 19, change "stored" to -- transferred --.
Lines 24-25, change"generate displaying using display files" to -- generates displays using files --.

Column 10,
Line 49, delete the first occurrence of "to the".

Signed and Sealed this

Twenty-seventh Day of May, 2003

JAMES E. ROGAN
*Director of the United States Patent and Trademark Office*